United States Patent [19]

Rehmer et al.

[11] Patent Number: 5,264,533
[45] Date of Patent: Nov. 23, 1993

[54] BENZOPHENONE DERIVATIVES AND THEIR PREPARATION

[75] Inventors: Gerd Rehmer, Bobenheim-Roxheim; Andreas Boettcher, Nussloch; Michael Portugall, Wachenheim, all of Fed. Rep. of Germany

[73] Assignee: BASF Aktiengesellschaft, Ludwigshafen, Fed. Rep. of Germany

[21] Appl. No.: 742,163

[22] Filed: Aug. 1, 1991

Related U.S. Application Data

[63] Continuation of Ser. No. 654,392, Jan. 30, 1991, abandoned, which is a continuation of Ser. No. 366,164, Jun. 14, 1989, abandoned.

[30] Foreign Application Priority Data

Jun. 16, 1988 [DE] Fed. Rep. of Germany ....... 3820464

[51] Int. Cl.⁵ ................. C08F 126/02; C08F 226/02; C08F 271/00; C08F 2/50
[52] U.S. Cl. .................................. 526/301; 522/34; 522/35; 522/116; 522/152; 522/904; 522/905; 526/302; 526/303.1
[58] Field of Search ................. 526/301; 522/39, 905, 522/904, 116, 152

[56] References Cited

U.S. PATENT DOCUMENTS

| | | | |
|---|---|---|---|
| 3,322,818 | 5/1967 | Hanze | 560/133 |
| 3,565,779 | 2/1971 | Luders | 522/905 |
| 3,574,617 | 4/1971 | Skoultchi | 522/905 |
| 3,641,217 | 2/1972 | Agolini | 522/905 |
| 3,661,618 | 5/1972 | Brookman | 427/44 |
| 3,957,921 | 5/1976 | Iwahashi | 260/901 |
| 4,045,514 | 8/1977 | Iwahashi | 260/901 |
| 4,504,628 | 3/1985 | Johnson | 526/301 |
| 4,634,791 | 1/1987 | Meier | 560/115 |
| 4,737,559 | 4/1988 | Kellen | 526/291 |
| 4,741,958 | 5/1988 | Bishop | 522/168 |

FOREIGN PATENT DOCUMENTS

| | | |
|---|---|---|
| 0017364 | 10/1980 | European Pat. Off. . |
| 0088300 | 9/1983 | European Pat. Off. . |
| 168773 | 1/1986 | European Pat. Off. . |
| 2411169 | 9/1974 | Fed. Rep. of Germany . |
| 6606711 | 11/1966 | Netherlands . |
| 1298019 | 11/1972 | United Kingdom . |

Primary Examiner—Marion E. McCamish
Assistant Examiner—A. H. Koeckert
Attorney, Agent, or Firm—Oblon, Spivak, McClelland, Maier & Neustadt

[57] ABSTRACT

UV-crosslinkable materials based on (meth)acrylate copolymers and containing special modified unsaturated benzophenone derivatives as copolymerized units are used as hotmelt adhesives, for coating sheet-like mineral substrates and as surface coatings.

4 Claims, No Drawings

BENZOPHENONE DERIVATIVES AND THEIR PREPARATION

This application is a continuation of application Ser. No. 07/654,392 filed on Jan. 30, 1991, now abandoned, which is a continuation of Ser. No. 07/366,164 filed Jun. 14, 1989 now abandoned.

The present invention relates to materials which can be crosslinked with UV light in the air and can be used, in particular, as hotmelt adhesives, for coating mineral substances, for example roofing tiles, and as surface coatings. The materials should have increased reactivity toward UV radiation. When used as hotmelt adhesives, the products should have a low melt viscosity, good tack and increased heat distortion resistance.

Dutch Patent Application 6,606,711 discloses contact adhesive tapes which are produced by coating a sheet-like substrate with a polyacrylate adhesive, one or more monomeric acrylates, e.g. 2-ethylhexyl acrylate, being present and being polymerized by exposure to UV light followed by heating. However, in order to obtain useful results, exposure must be carried out under an inert gas atmosphere. Furthermore, the presence of readily volatile acrylates which may irritate skin and eyes is disadvantageous.

Dutch Patent Application 7,009,629 further discloses a process for the preparation of adhesives, in which mixtures of acrylates and methacrylates, such as 2-ethylhexyl acrylate, with organic polymers, such as cellulose derivatives, polyolefins or polyesters, as viscosity regulators and, if required, together with a tackifier, such as polyvinyl methyl ether, are applied in a thin layer to a sheet-like substrate and treated with high-energy radiation. In this process too, the presence of the monomeric (meth)acrylates, which have an irritant effect and are readily volatile, is disadvantageous, and furthermore only products whose cohesion is insufficient for many applications in the contact adhesive sector are obtained.

In the process of German Laid-Open Application DOS 2,357,586 for the production of self-adhesive coatings, ionizing radiation is used for exposure, the mixture exposed being a mixture which is liquid at room temperature and consists of (A) a monoolefinically unsaturated monomer which forms tacky polymers at room temperature, (B) a diolefinically or polyolefinically unsaturated compound, (C) a polymer having a softening point below 50° C. and a mean molecular weight of from 500 to 10,000 and (D) a conventional photoinitiator, for example benzoin, acetophenone or benzophenone, and which is likewise applied to a sheet-like substrate. In this process too, acrylates and methacrylates of alkanols of 4 to 12 carbon atoms can be used as monomers (A). Although the adhesive layers produced by this process have a high shear strength at room temperature and good surface tack, they have relatively great cold flow, and insufficient shear strength at elevated temperatures.

High-energy radiation is also employed by the process of European Patent 88,300, in which self-adhesive coatings are obtained by coating substrates with derivatives of dihydroxypropylacrylates mixed with polymers having a glass transition temperature below 0° C. and a K value of from 20 to 80 and/or a tackifying resin. Although this process gives good surface tack and good heat distortion resistance, the irritant monomers and the necessity of working under an inert gas atmosphere give rise to disadvantages.

Since photoinitiators are present in the case of materials which are to be crosslinked with UV radiation, these photoinitiators should be very readily soluble in the materials and should not exude from the materials in order to enable the materials to be processed at elevated temperatures too. Furthermore, on exposure these photoinitiators should not form any degradation products which tend to exude and have a strong intrinsic odor.

Copolymerizable photoinitiators have therefore also been used in UV-curable materials. Thus, EP-A-0 017 364 describes, for example, copolymers which are suitable, inter alia, as adhesives and for sealing compounds and which contain from 0.1 to 10% by weight of allyl benzoylbenzoate as a copolymerized photoinitiator. Although these materials can be crosslinked with UV radiation, they give crosslinked products having a very high viscosity. Moreover, their reactivity to UV radiation is too low and tacky layers produced from them do not meet the requirements set for a good contact adhesive. Furthermore, irritant monomers are also used in this process (Example 10).

According to German Laid-Open Application DOS 2,411,169, contact adhesives crosslinkable with ultraviolet radiation can be prepared by using copolymers of (meth)acrylates which contain monoolefinically unsaturated ether and ester derivatives of substituted benzophenones as copolymerized photoinitiators. However, the copolymerized benzophenone derivatives are less reactive to UV radiation and the pressure-sensitive adhesives prepared from the copolymers do not meet high requirements. Moreover, hotmelt adhesives prepared by this method have an excessively high melt viscosity, which makes them unsuitable for use in practice.

Furthermore, EP-A-0 246 848 discloses UV-crosslinkable contact adhesives based on polyacrylates, which contain monoolefinically unsaturated benzophenone derivatives as copolymerized photoinitiators. These contact adhesives are intended for use in the medical field, for example for plasters, and their adhesion to the skin should not increase in the course of time. However, the disadvantage of these contact adhesives is that they have only little reactivity to UV radiation and a comparatively high melt viscosity.

We have found that UV-crosslinkable materials based on (meth)acrylate copolymers having a K value of from 15 to 100, are particularly advantageous if they contain from 0.01 to 10% by weight, based on the copolymers, of copolymerized monomers of the general formula I

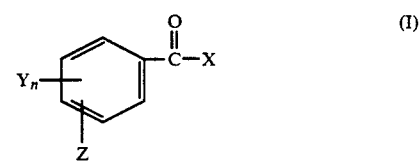

where X is alkyl of 1 to 3 carbon atoms or is phenyl which is unsubstituted or substituted by n Y groups, Y is —H, —CF₃, —O—alkyl and/or alkyl—COO—, where alkyl in each case is of 1 to 4 carbon atoms, halogen, —CN, —COOH or a non-ortho —OH group, n is from 0 to 4 and Z is a group of the general formula

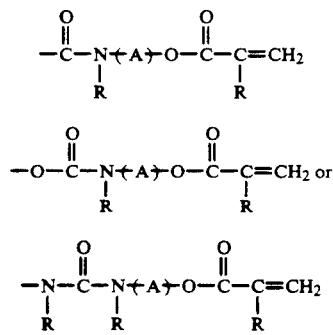

where R is H or $C_1$–$C_4$-alkyl and A is an alkylene, oxaalkylene or polyoxaalkylene radical of 2 to 12 carbon atoms.

The copolymers generally contain, as principal monomers, predominant amounts of, in general, from 50 to 99.99, preferably from 70 to 97.5, % by weight of acrylates and/or methacrylates of alkanols of 1 to 24, in particular 1 to 12, carbon atoms, such as methyl, ethyl, propyl, isoamyl, isooctyl, n-butyl, isobutyl, tert-butyl, cyclohexyl, 2-ethylhexyl, decyl, lauryl or stearyl acrylate and/or methacrylate as copolymerized units. Examples of suitable comonomers are vinyl esters of saturated carboxylic acids of 1 to 20, in particular 2 or 3, carbon atoms, such as vinyl formate, vinyl acetate or vinyl propionate, and also vinyl laurate and vinyl stearate, vinyl ethers of 3 to 22 carbon atoms, such as methyl, ethyl, butyl, hexyl or octadecyl vinyl ether, vinylaromatics of 8 to 12 carbon atoms, in particular styrene, as well as α-methylstyrene, vinyltoluenes, tert-butyl styrene and halostyrenes, olefins of 2 to 20 carbon atoms, in particular ethylene and propylene, and also n-butylene, isobutylene, diisobutene, triisobutene and oligopropylenes, and/or vinyl halides, in particular vinyl chloride and vinylidene chloride, and allyl ethers or allyl esters. Copolymers which contain from 0.5 to 20, preferably from 2 to 10, % by weight, based on the copolymers, of tetrahydrofurfur-2-yl acrylate or methacrylate and/or alkoxy-containing monomers, such as 3-methoxybutyl (meth)acrylate, 2-methoxyethyl (meth)-acrylate, 2-butoxyethyl (meth)acrylate, 2-ethoxyethyl (meth)acrylate, N-butoxymethyl (meth)acrylamide and/or N-isobutoxymethyl (meth)acrylamide, as copolymerized units in addition to other acrylates and methacrylates are of particular interest, tetrahydrofurfur-2-yl acrylate and methacrylate and 3-methoxybutyl acrylate and methacrylate being preferred.

The copolymers also particularly advantageously contain from 0.1 to 10, preferably from 0.5 to 4, % by weight of α,β-monoolefinically unsaturated mono- and/or dicarboxylic acids of 3 to 5 carbon atoms and/or their amides or, if desired, monoalkyl esters or anhydrides of the dicarboxylic acids as copolymerized units. Examples of these are, in particular, acrylic and methacrylic acid and itaconic acid, and also crotonic acid, fumaric acid, maleic acid, maleic anhydride, n-butyl-maleic monoesters, monoethyl fumarate, monomethyl itaconate and monomethyl maleate. Particularly interesting amides of such carboxylic acids are acrylamide and methacrylamide. N-methyl acrylamide and -methacrylamide, N-methylolacrylamide and -methacrylamide, maleic acid monoamide and diamide, itaconic acid monoamide and diamide and fumaric acid monoamide and diamide are also suitable. In some cases, vinylsulfonic acid or vinylphosphonic acids are also suitable, in amounts of from 0.1 to 5% by weight, based on the copolymers.

Other suitable comonomers, in amounts of not more than 30, preferably from 0.5 to 5, % by weight, are olefinically unsaturated tertiary amino compounds, such as N,N-dimethylaminoethyl- and N,N-diethylaminoethyl(meth)-acrylamide,N,N-diisopropyl(-meth)acrylamide,N,N-dibutyl(meth)acrylamide, N,N-dimethylaminoethyl (meth)acrylate and N,N-diethylaminoethyl (meth)acrylate, dimethyl- and diethylaminoethyl vinyl ether, N-vinylimidazole, N-vinylimidazoline, vinylpyridines, dialkyl(meth)acrylamides, N-vinylformamide, N-vinylpyrrolidone, N-vinylcaprolactam, p-hydroxy(meth)acrylic acid anilide, N-tert-butyl(meth)-acrylamide, diacetone(meth)acrylamide, N-(1-methylundecyl) (meth)acrylamide, N-isobornyl(meth)acrylamide, N-adamantyl(meth)acrylamide, N-benzyl(meth)acrylamide, N-4-methylphenyl(-meth)acrylamide, methyl(meth)acrylamide, N-diphenylmethylacrylamide, phthalimidomethyl(meth-)acrylamide, (meth)acrylamidohydroxyacetic acid, (meth)acrylamidoacetic acid, (meth)acrylamidoacetic esters, such as methyl (meth)acrylamidoacetate, 2-(meth)acrylamido-2-methylbutyric acid, N-(2,2,2-trichloro-1-hydroxy)-ethyl(meth)acrylamide, N,N-bis-(2-cyanoethyl)-methacrylamide, N-(1,1,1-trishydroxymethyl)(meth)acrylamide, methyl-(meth)acrylamide and N-(3-hydroxy-2,2-dimethylpropyl)(meth)acrylamide.

Other examples are 2-hydroxy-3-[N,N-di-(2-hydroxyethyl)]-propyl (meth)acrylate, 2-methoxy-3-[N,N-di-(2-hydroxyethyl)]-propyl (meth)acrylate, 2-hydroxy-3-[N-hydroxyethyl-N-alkyl]-propyl (meth)acrylates and/or 2-hydroxy-3-[N,N-dialkyl]-propyl (meth)acrylate where alkyl is of 1 to 10 carbon atoms, such as 2-hydroxy-3-[N-hydroxyethyl-N-methyl]-propyl (meth-)acrylate and 2-hydroxy-3-[N-ethyl-N-methyl]-propyl(-meth)acrylate. Finally, monoolefinically unsaturated monomers such as 3-cyclohexylprop- 1-yl (meth)acrylate, cyclohexyl (meth)acrylate, 4-tert-butylcyclohexyl (meth)acrylate, 2-N-morpholinoethyl (meth)acrylate, 2-N-morpholinohexyl (meth)acrylate and furfuryl (meth)acrylate, isobornyl (meth)acrylate, N-cyclohexyl(meth)acrylamide and N-isobornyl(meth)acrylamide are also suitable, in amounts of not more than 30, preferably from 0.1 to 25, particularly preferably from 0.5 to 20, % by weight. The copolymers generally have K values of from 15 to 100, determined according to DIN 53,726 in 1% strength solution in tetrahydrofuran at 25° C. The K value is preferably from 25 to 50 if the materials are to be used as hotmelt adhesives. If the materials are to be used for coating roofing tiles, their K values are preferably from 60 to 100, and materials which are to be used for surface coatings preferably have K values of from 15 to 85.

The UV-crosslinkable materials which, in the case of contact adhesives, are applied in the form of their melts, generally have Staudinger indices (viscosity numbers) of from 0.10 to 1.60, preferably from 0.2 to 0.9, very particularly preferably from 0.25 to 0.49, 100 ml/g (measured in tetrahydrofuran at 25° C.).

The compounds of the general formula I can be prepared by known processes. Of particular interest are the acrylates and/or methacrylates of the compound II

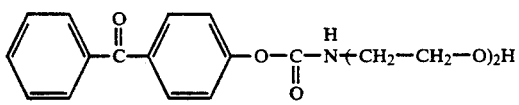

II

Other very suitable benzophenone derivatives to be copolymerized are the acrylates and methacrylates of the compounds III and IV

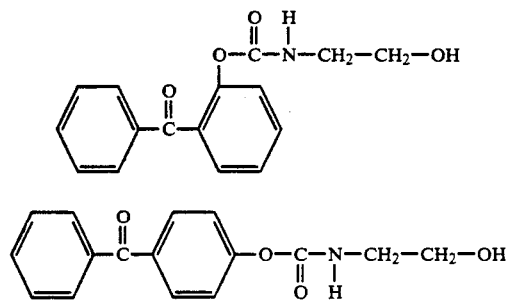

III

IV and examples of suitable acetophenone derivatives are the compounds V and VI

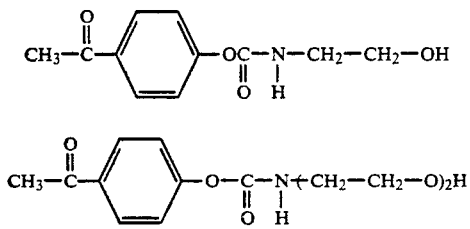

V

VI

These compounds are acrylates and methacrylates of acetophenone and benzophenone derivatives which have an N-hydroxyalkylcarbamic ester group at the ortho or para position of a phenyl group of the acetophenone or of the benzophenone, the alkyl group of the said ester group being of 2 to 4 carbon atoms which may be bonded to one another via an ether bridge.

Finally, the copolymers may contain further copolymerized monomers having functional groups, in amounts of not more than 20% by weight, for example hydroxyalkyl (meth)acrylates, such as 2-hydroxypropyl (meth)acrylate, 2-hydroxyethyl (meth)acrylate, 4-hydroxybutyl (meth)acrylate and glycidyl acrylate and methacrylate. Monoacrylates and monomethacrylates of polyetherols or of oxypropylated fatty alcohols, for example having a molecular weight of from 200 to 10,000, or of polyoxyethylated alkanols and/or phenols, in amounts of from 0.5 to 10% by weight, may also be advantageous comonomers in some cases.

If the copolymers are to be used as contact adhesives, the acrylates and/or methacrylates used as principal monomers are preferably those whose homopolymers have glass transition temperatures below 0° C., in particular below −10° C., in particular n- and isobutyl acrylate and methacrylate, isoamyl and isooctyl acrylate and methacrylate and 2-ethylhexyl acrylate and methacrylate, as well as decyl acrylate and lauryl acrylate and methacrylate. The amount of these principal monomers is then preferably more than 60% of the total monomers.

The copolymers generally contain from, 0.01 to 10% by weight of copolymerized monomers of the general formula I, although amounts of from 0.01 to 5% by weight, based on the copolymers, are frequently sufficient. Copolymers which contain from 0.5 to 25, in particular from 5 to 15, % by weight of tetrahydrofurfur-2-yl (meth)acrylate in addition to other acrylates and monomers of the general formula I as copolymerized units often have a very low molecular weight and a low viscosity.

The novel UV-crosslinkable (meth)acrylate copolymers can be prepared by copolymerization of the monomeric components using the conventional polymerization initiators and, if required, regulators, polymerization being carried out at the conventional temperatures in the form of mass polymerization, emulsion polymerization, for example in water or liquid hydrocarbons, or solution polymerization. The novel copolymers are preferably prepared by polymerization of the monomers in solvents, in particular in solvents boiling within a range from 50° to 150° C., preferably from 60° to 120° C., using the conventional amount of polymerization initiators, which in general is from 0.01 to 10, in particular from 0.1 to 4, % by weight, based on the total weight of the monomers. Particularly suitable solvents are alcohols, such as methanol, ethanol, n-propanol, isopropanol, n-butanol and isobutanol, preferably isopropanol and/or isobutanol, and hydrocarbons, such as toluene and, in particular, gasolines boiling within a range from 60° to 120° C. Ketones, such as acetone and methyl ethyl ketone, and esters, such as ethyl acetate, and mixtures of solvents of the stated type can also be used, mixtures which contain isopropanol and/or isobutanol in amounts of from 5 to 95, in particular from 10 to 80, preferably from 25 to 60, % by weight, based on the solvent mixture used, being preferred.

Suitable polymerization initiators in the solution polymerization are, for example, 2,2'-azobisisobutyronitrile, acyl peroxides, such as benzoyl peroxide, dilauroyl peroxide, didecanoyl peroxide and isononanoyl peroxide, alkyl peresters, such as tert-butyl perpivalate, tert-butyl per-2-ethylhexanoate, tert-butyl permaleate, tert-butyl perisononanoate and tert-butyl perbenzoate, dialkyl peroxides, such as dicumyl peroxide, tert-butyl peroxide, di-tert-butyl peroxide and peroxy-dicarbonates, such as dimyristyl peroxydicarbonate, bicetyl peroxydicarbonate, bis-(4-tert-butylcyclohexyl) peroxydicarbonate, dicyclohexyl peroxydicarbonate and di-2-ethylhexyl peroxydicarbonate, hydroperoxides, such as cumene hydroperoxide and tert-butyl hydroperoxide, and polymerization initiators such as 3,4-dimethyl-3,4-diphenylhexane and 2,3-dimethyl-2,3-diphenylbutane. Particularly preferred polymerization initiators are ketone peroxides, such as methyl ethyl ketone peroxide, acetylacetone peroxide, cyclohexanone peroxide and methyl isobutyl ketone peroxide.

After the solution polymerization, the solvents can, if required, be separated off under reduced pressure and at elevated temperatures, for example from 100° to 150° C. The novel copolymers can then be used in the solvent-free state, i.e. as a melt, in particular as a hotmelt adhesive, but also for coating mineral substances, in particular roofing tiles, and as surface coatings. In some cases, it is also advantageous to prepare the novel, UV-crosslinkable copolymers by mass polymerization, i.e. in the absence of a solvent; the procedure can be carried out batchwise or continuously, for example as described in U.S. Pat. No 4,042,768.

If the novel copolymers are used in the form of solutions, for example for surface coatings or for coating roofing tiles, the mixtures of the copolymers and solvents generally contain from 10 to 900, preferably from 20 to 200, in particular from 25 to 150, % by weight of solvents. Preferably, however, the copolymers are used in solvent-free form.

In some cases, for example if the novel copolymers are prepared in aqueous emulsion by emulsion polymerization, conventional regulators in the usual amounts, for example of from 0.1 to 15, preferably from 2 to 10, % by weight, based on the monomers, may also be used. Examples of regulators of this type are mercapto compounds, such as 2-mercaptoethanol, methyl 3-mercaptopropionate, 3-mercaptopropionic acid, 1,6-dimercaptohexane or 1,9-dimercaptononane, hydrocarbons, such as cumene, alcohols, such as isopropanol or isobutanol, and halohydrocarbons, such as carbon tetrachloride, tetrabromomethanol, chloroform or bromoform. Preferred regulators are compounds such as 3-mercaptopropionic acid, 3-mercapto-1,2-propanediol, 2-mercaptoethanol, glycerol and di- and triglycerides. Ethers, such as dioxane and tetrahydrofuran can also be used as regulators.

When the novel materials are used, they may be modified and/or compounded in a conventional manner. For example, conventional tackifying resins, e.g. hydrocarbon resins, unmodified or modified rosins, terpene/phenol resins, ketone resins, aldehyde resins or homopolymers, such as poly-2-ethylhexyl acrylate and poly-n-butyl acrylate, plasticizers, such as those based on mono-, di- or polyester compounds, polychlorinated hydrocarbons or liquid paraffins, dyes and pigments, or stabilizers or elastomeric substances, such as natural or synthetic rubber, polyvinyl ethers and polybutadiene oils may be added. Modification may also be carried out using relatively high molecular weight monoolefinically or polyolefinically unsaturated compounds, such as polyesterols and polyetherols esterified with acrylic acid, e.g. tri-propylene glycol acrylate, tetraethylene glycol acrylate, polyethylene glycol diacrylate and polytetrahydrofuran. Diacrylates and dimethacrylates of polytetrahydrofuran having number average molecular weights of in general from 250 to 2,000 are also suitable. Such diolefinically or polyolefinically unsaturated compounds can advantageously be used in amounts of from 0.1 to 10% by weight, based on the novel copolymer, diolefinically unsaturated compounds of this type having a number average molecular weight of not less than 500 being of particular interest.

The novel UV-crosslinkable materials are particularly suitable in the form of melts or as solutions or in the form of aqueous dispersions for the production of coatings and for impregnation, in particular in the form of contact adhesives, pressure-sensitive adhesive films and pressure-sensitive adhesive labels, and blocking foils. The materials can be applied in a conventional manner by brushing, spraying, roller-coating, knife coating or pouring, if necessary at elevated temperatures, generally at from 20° to 150° C., to conventional substrates, for example to paper, board, wood, metals and plastic films, for example films of plasticized PVC, polyethylene, polyamides or polyethylene glycol terephthalate, or aluminum or polypropylene.

If solvents are present, they can readily be evaporated off from the coatings, if required, at room temperature or slightly elevated temperatures, in general at from 20° to 150° C., preferably from 50° to 80° C., radiant heaters or hot air circulation apparatuses being used in a conventional manner. The coatings, which may be dried or predried, can then be crosslinked by exposure to UV light to give coatings which have good tack, high cohesion and good peeling strength in combination with excellent aging resistance. Exposure need not be carried out under an inert gas atmosphere but may be effected in the air. The UV lamps used may be the usual lamps, for example low pressure, medium pressure and high pressure mercury vapor lamps, which can have powers of, for example, from 80 to 160 watt/cm. Lamps having a higher power generally permit faster crosslinking. In some cases, residual solvent or water can be removed simultaneously by the IR component of the lamps during exposure to effect crosslinking.

The adhesive properties of sheet-like substrates which have a contact adhesive layer can be determined by measuring the shear strength as a measure of the cohesion and the peeling strength as an overall measure of cohesion and surface tack.

For the test, films of polyethylene glycol terephthalate are coated with the novel materials so that the resulting dry layer is 25 $\mu$m in thickness.

The solvents are evaporated off for 1 minute at 70° C. and under 1 bar. The coated and dried films are exposed to light from medium pressure mercury lamps.

Exposure is effected using two medium pressure mercury lamps which are arranged one behind the other and each of which has a power of 80 watt/cm. The coated and dried films are placed on a continuous moving belt, so that the coated films pass below the lamps at a distance of 15 cm and at a speed of 10 m/min.

Exposure is effected in the air.

The films thus produced are cut into 2 cm wide strips and these strips are applied to a chromium-plated brass plate. The plate with the strips is stored for 24 hours at 23° C. and 65% relative humidity.

To measure the peeling strength, the test strips are pulled off backward, parallel to the adhesive layer, at a speed of 300 mm/min. The force required for this purpose is measured.

In the measurement of the shear strength, an adhesively bonded area of 20×25 mm is cut out, the plate is clamped vertically and the projecting part of the adhesive strip is subjected to a weight of 1 kg. The time taken to break the adhesive bond is determined. The measurement is carried out at 23° C. and 50° C. All measurements are carried out in triplicate.

In the Examples which follow, parts and percentages are by weight. The K values are determined according to DIN 53,726, in 1% strength solution in tetrahydrofuran at 25° C. The melt viscosities are measured in a plate-and-cone rheometer, for example a Rotovisko RV 20 with measuring unit PK 100 (from Haake, Karlsruhe).

The Staudinger index (viscosity number) is determined in tetrahydrofuran at 25° C. by a known method (e.g. G. V. Schulz and H.-J. Cantow in Houben-Weyl, Methoden der organischen Chemie, G. Thieme Verlag, 1955, Vol. 3/1, pages 431–445, and B. Vollmert: Grundriss der makromolekularen Chemie, Volume III, page 55 et seq.).

EXAMPLES

Copolymer Solution P1

320 parts of a mixture of 400 parts of 2-ethylhexyl acrylate, 470 parts of n-butyl acrylate, 30 parts of acrylic acid, 100 parts of tetrahydrofurfur-2-yl acrylate and 50 parts of a benzophenone derivative of the general formula VII

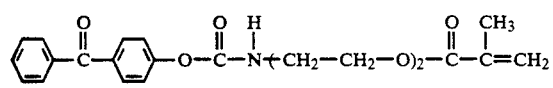

are added to a mixture of 200 parts of isopropanol and 6 parts of methyl ethyl ketone peroxide.

The mixture is polymerized at 95° C. for 20 minutes. The remainder of the monomer mixture and a solution of 8 parts of methyl ethyl ketone peroxide in 30 parts of isopropanol are added to this prepolymerized mixture in the course of 2 hours, and polymerization is carried out for a further 4 hours at 100° C. A colorless clear solution of a copolymer P1 which has a K value of 24 is obtained. The copolymer P1 freed from solvent and volatile constituents has a melt viscosity of 35 Pa.s at 25° C.

Copolymer P2

The procedure described for copolymer solution P1 is followed, except that the tetrahydrofurfur-2-yl acrylate is replaced with the same amount of 3-ethoxybutyl acrylate, and furthermore 17 parts of the n-butyl acrylate are replaced with 17 parts of methyl methacrylate. In this case, a colorless clear solution of a copolymer P2 having a K value of 28 is obtained; after removal of the solvent and of volatile constituents, the said copolymer has a melt viscosity of 15 Pa.s at 50° C.

Mixture M1

3.5 parts of polytetrahydrofuran diacrylate (molecular weight 650) and 5 parts of an abietic acid resin (Foral ® 85 from Hercules) are added to 100 parts of the copolymer P2. The resulting mixture exhibits good flow at room temperature.

Mixture M2

5 parts of polytetrahydrofuran dimethacrylate (molecular weight 1,000) and 10 parts of an abietic acid resin (Floral ® 85 from Hercules) are added to 100 parts of the copolymer P1. A mixture which exhibits good flow at room temperature is obtained.

Copolymer solution P3

The procedure described for copolymer solution P1 is followed, except that the benzophenone derivative VII is replaced with 44.4 parts of the benzophenone derivative VIII

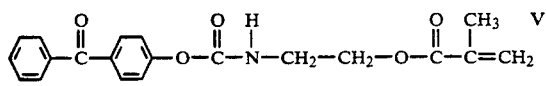

which is prepared according to Example 1 of Patent Application P . . . (O.Z. 0050/39979). A solution of a copolymer P3 having a K value of 25 is obtained; after removal of the solvent and of the volatile constituents, the said copolymer has a melt viscosity of 36 Pa.s at 25° C.

Mixture M3

100 parts of the copolymer P3 are mixed with 5 parts of a commercial oligoester acrylate (DYNACOL ® A, Type 2530 VP from Dynamit Nobel) and a mixture exhibiting good flow at room temperature is obtained.

The shear strengths, peeling strengths and tacks measured for the polymers and their mixtures are summarized in the Table below, mixtures M1 and M2 being exposed using a speed of the continuous belt of 10 m/min.

TABLE 1

| | Results of the performance tests on the contact adhesives | | | | |
|---|---|---|---|---|---|
| | Shear strength [hours] at | | Peeling strength [N/2 cm] | | |
| Sample | 23° C. | 50° C. | Immediately | After 24 hours | Tack |
| P1 | >100 | >10 | 4.1 | 7.5 | Good |
| P2 | >100 | >10 | 3.5 | 7.0 | Good |
| M1 | >80 | >5 | 5.0 | 8.0 | Good |
| M2 | >70 | >5 | 4.0 | 7.8 | Good |
| P3 | >50 | >2 | 4.0 | 8.2 | Good |
| M3 | >50 | >4 | 3.0 | 6.0 | Good |

Copolymer Solution P4

A mixture of 200 parts of ethyl acetate, 50 parts of tetrahydrofuran, 7.5 parts of dimethyl 2,2'-azobisisobutyrate and 200 parts of a monomer mixture of 600 parts of n-butyl acrylate, 230 parts of isooctyl acrylate, 150 parts of methyl methacrylate, 20 parts of acrylic acid and 7.5 parts of the benzophenone derivative of the general formula VII is prepolymerized at 96° C. for 20 minutes.

The remainder of the monomer mixture is added to the reaction mixture in the course of 2 hours. After the addition is complete, the mixture is stirred under reflux for 2 hours, after which a solution of 2 parts of tertbutyl per-2-ethylhexanoate in 83 g of ethyl acetate is added under reflux and refluxing is continued for a further 4 hours.

A solution of a copolymer having a K value of 39 and a Staudinger index (viscosity number) of 0.38 [100 ml/g] is obtained.

After the solvent and volatile constituents have been distilled off and the residue subjected to subsequent distillation at 135° C. under reduced pressure, a resin exhibiting good flow at room temperature is obtained.

The melt viscosity at 120° C. is 15 Pa.s (D=500 l/s).

Polyester films are coated with the resin on a heatable coating table at 95° C. in an amount of 25 g/m².

The coated films are placed on the running continuous belt of a UV exposure apparatus and are passed once at a speed of from 15 to 25 m/min below a medium pressure mercury lamp having a radiant power of 80 watt/cm.

The adhesive-coated paper is applied to the exposed films. After storage for 24 hours, the adhesion tests are carried out.

TABLE 2

| Results of the performance tests on the copolymer P4 as a contact adhesive | | | | | |
|---|---|---|---|---|---|
| Belt speed [m/min] | Shear strength [hours] | | Peeling strength [N/2 cm] | | |
| | 23° C. | 50° C. | Immediately | After 24 hours | Tack |
| 15 | >24 | >24 | 3.3 | 7.3 | Good |
| 20 | >24 | >24 | 3.5 | 7.6 | Good |
| 25 | >24 | >24 | 4.5 | 7.5 | Good |

We claim:

1. A UV-crosslinkable material based on a (meth)-acrylate copolymer having a K value of from 15 to 100 and containing from 0.01 to 10% by weight, based on the copolymer, of copolymerized monomers of the formula I

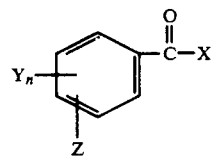
(I)

where X is alkyl of 1 to 3 carbon atoms or is phenyl which is unsubstituted or substituted by n Y groups, Y is —H, —CF$_3$, —O—alkyl and/or alkyl—COO—, where alkyl in each case is of 1 to 4 carbon atoms, halogen, —CN, —COOH or a non-ortho —OH group, n is from 0 to 4 and Z is a group of the formula

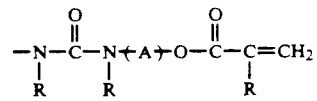

where R is H or C$_1$–C$_4$-alkyl and A is an alkylene, oxaalkylene or polyoxaalkylene radical of 2 to 12 carbon atoms.

2. A UV-crosslinkable material as claimed in claim 1, which contains an acrylate and/or methacrylate of the compound

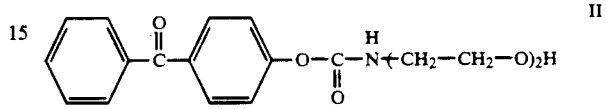
II as copolymerized monomers of the formula I.

3. A UV-crosslinkable material as claimed in claim 1, wherein the amount of the monomer of formula I in the UV-crosslinkable copolymer ranges from 0.01 to 5% by weight.

4. A UV-crosslinkable material as claimed in claim 1, wherein the (meth)acrylate copolymer contains from 0.5 to 25% by weight of tetrahydrofurfur-2-yl (meth)acrylate.

* * * * *

UNITED STATES PATENT AND TRADEMARK OFFICE
CERTIFICATE OF CORRECTION

PATENT NO. : 5,264,533
DATED : November 23, 1993
INVENTOR(S) : Gerd Rehmer, et. al.

It is certified that error appears in the above-indentified patent and that said Letters Patent is hereby corrected as shown below:

Column 12, lines 1-5, delete formula " $-N-\underset{R}{\overset{O}{\overset{\|}{C}}}-\underset{R}{N}-A-O-\underset{R}{\overset{O}{\overset{\|}{C}}}-C=CH_2$ "

and insert therefor formula -- $-O-\overset{O}{\overset{\|}{C}}-\underset{R}{N}-A-O-\overset{O}{\overset{\|}{C}}-\underset{R}{C}=CH_2$ --.

Signed and Sealed this

Twenty-fourth Day of January, 1995

Attest:

BRUCE LEHMAN

Attesting Officer     Commissioner of Patents and Trademarks